United States Patent [19]
Koller et al.

[11] Patent Number: 6,009,542
[45] Date of Patent: Dec. 28, 1999

[54] METHOD FOR PREVENTING TRANSFER OF DATA TO CORRUPT ADDRESSES

[75] Inventors: Justin J. Koller, Westboro; Nick Horgan, Marlboro; Bruce Buch, Westboro; Diana Langer, Northborough; Timothy Proch, Shrewsbury, all of Mass.

[73] Assignee: Quantum Corporation, Milpitas, Calif.

[21] Appl. No.: 09/052,813

[22] Filed: Mar. 31, 1998

[51] Int. Cl.$^6$ .................................................. G06F 11/34
[52] U.S. Cl. ........................ 714/53; 714/42; 714/718; 714/799; 714/819
[58] Field of Search ............................. 714/53, 718, 48, 714/42, 799, 819

[56] References Cited

U.S. PATENT DOCUMENTS

| | | | |
|---|---|---|---|
| 4,903,194 | 2/1990 | Houdek et al. | 714/53 |
| 5,444,722 | 8/1995 | Tran | 714/42 |

*Primary Examiner*—Phung M. Chung
*Attorney, Agent, or Firm*—Michael Zarrabian

[57] ABSTRACT

A method of data transfer in a data processing system having at least one source buffer and at least one destination buffer. The source buffer includes a plurality of data blocks, each data block having an address and being for storage of data including an identifier uniquely identifying that data block. The destination buffer includes a plurality of data blocks corresponding to the data blocks of the source buffer, each destination block having an address and being for storage of data. Each source block identifier is a function of a corresponding destination block address. Transferring data from the source buffer to the destination buffer includes: (a) obtaining the address of a data block in the destination buffer to transfer data into; (b) obtaining the address of a corresponding data block in the source buffer to transfer data from; and (c) checking the integrity of said addresses before data transfer, including: (i) retrieving the source block identifier in the source block via the source block address; (ii) generating an expected identifier value for the source block from the address of the destination block via said function relation between the source block identifier and the destination block address; (iii) comparing the expected identifier value with the retrieved identifier value; and (iv) if there is a mismatch, signaling an error condition representing corruption of one or more of the source block and the destination block addresses.

35 Claims, 7 Drawing Sheets

METHOD FOR PREVENTING TRANSFER OF DATA TO CORRUPT ADDRESSES

FIELD OF THE INVENTION

The present invention relates to data transfer, and in particular to data transfer between various data storage devices within a computer system.

BACKGROUND

As data is transferred in a data processing system from a source location such as a Random Access Memory (RAM) buffer to a destiny location such as a disk drive disk, several errors can corrupt the addresses used in accessing the source and destiny locations. One such error is corruption of the address for accessing the source. In that case, the wrong data is read from the source. Another such error is corruption of the address of the destination. In that case, the data is written to the wrong location. In either scenario, the transferred data is lost, and a later attempt to retrieve the desired data from the destiny fails.

During a "write" operation, data is transferred from the source to the destiny, and during a "read" that data is read from the destiny back to the source. If during a write operation a corrupt source address remains undetected, then the wrong data is transferred to the destiny. And, when that data is read back, the wrong data is returned, and the intended data is lost. If the destination address is corrupt during the write operation, the data is written to the wrong location and lost. As a result, the desired data will not be found on a "read" back operation. As a side effect of writing the data to the wrong location in the destiny, the data pointed to by the corrupt address is written over, resulting loss of other good data.

Prior methods of solving such problems are directed to protecting the addresses used for accessing the source and the destiny by techniques such as parity checks. However, such methods are inefficient and error prone themselves. There is, therefore, a need for a method of preventing data transfers from using corrupt addresses.

There is also a need for such a method to be efficient and simple to implement.

SUMMARY

The present invention satisfies these needs. In one embodiment, the present invention provides an efficient method of preventing erroneous transfer of data from a source buffer to a destination buffer within a data processing system. The source buffer includes a plurality of data blocks, each data block having an address and being for storage of data including an identifier uniquely identifying that data block. The destination buffer includes a plurality of data blocks corresponding to the data blocks of the source buffer. Each destination block has an address and is for storage of data. Further, each source block identifier is a function of the address of a corresponding destination block according to the present invention.

Transferring data from source buffer to the destination buffer includes the steps of: (a) obtaining the address of a data block in the destination buffer to transfer data into; (b) obtaining the address of a corresponding data block in the source buffer to transfer data from; and (c) checking the integrity of said addresses before data transfer. Checking integrity of the addresses includes the steps of: (i) retrieving the identifier in the source block via the source block address; (ii) generating an expected identifier value from the address of the destination block using the function relation between the source block identifier and the destination block address; (iii) comparing the expected identifier value with the retrieved identifier value; and (iv) if there is a mismatch, signaling an error condition representing corruption of one or more of the source block and the destination block addresses. If there is a match between the retrieved identifier and the expected identifier value, the data including the identifier stored in the source block can be transferred to the destination block. The above steps can be repeated for transferring data from a plurality of source blocks into a plurality of corresponding destination blocks in sequence.

A buffer list comprising a plurality of entries each corresponding to a source block can be utilized to keep track of the data blocks in the source buffer. Each buffer list entry includes an address corresponding to a source block for accessing that source block using an index into the buffer list. The index can be proportional to the address of the destination block corresponding to the source block. The address for each destination block can be a combination of a base and an offset, the offset being proportional to the buffer list index. In that case, the identifier in each source block is the sum of the base and offset of the address for a corresponding destination block. The method of the present invention can further include the steps of generating identifiers for one or more source blocks and storing data including the identifiers therein, before accessing the identifier in each source block and determining the expected identifier value for comparison with the retrieved identifier value for data transfer.

In another, aspect the present invention provides a controller comprising a logic circuit configured by program instructions to perform the steps of the method described above.

BRIEF DESCRIPTION OF THE DRAWINGS

These and other features, aspects and advantages of the present invention will become better understood with regard to the following description, appended claims and accompanying drawings where:

DESCRIPTION

Figure 1:
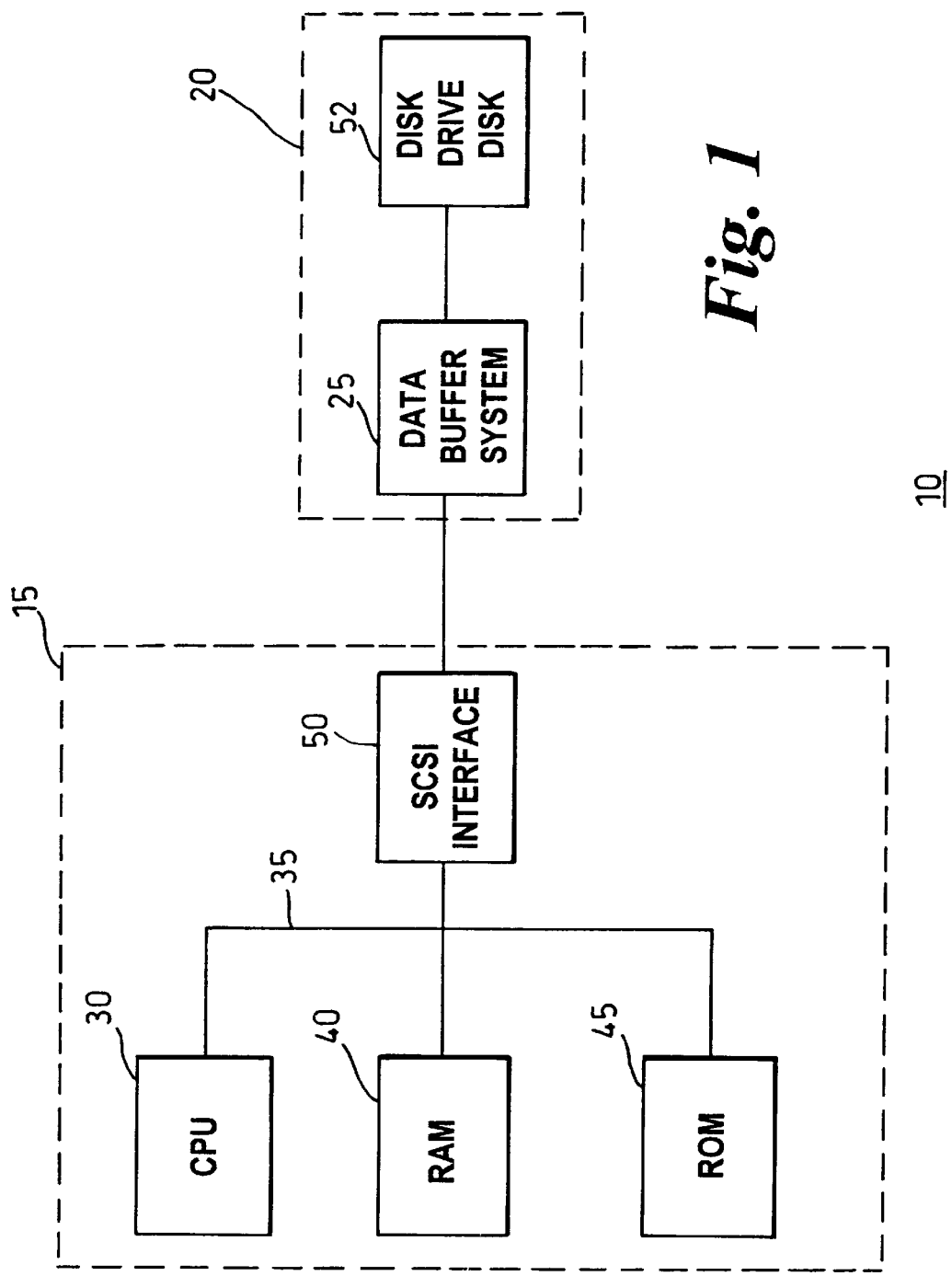
FIG. 1 shows a block diagram of an example computer system architecture in which the present invention can be implemented.

FIG. 1 shows a block diagram of an example computer system 10 in which a method embodying aspects of the present invention can be implemented. The computer system 10 typically includes a host 15 and a storage device, such as a disk drive 20. The disk drive 20 includes a data disk 52 secured to a spindle motor (not shown) for rotating the disk 52, a head carrier arm attached to an actuator for carrying a read/write head, and a drive controller coupled to the spindle motor and the actuator (not shown) for controlling read/write operations to the disk 52. The disk drive 20 further includes a data buffer system 25 to manage data transfer between the host 15 and the disk 52 according to the present invention. The data buffer system 25 can be a component of the disk drive 20, embedded in the disk drive controller.

As those skilled in the art will recognize, the present invention is capable of being implemented in a system having other storage devices and for managing transfer of data between such storage devices. Additionally, the host 15 generally refers to a host/SCSI interface, which one skilled in the art will recognize to include, for example, a CPU 30 interconnected via a BUS 35 to ROM 40, RAM 45 and a SCSI interface 50. The present invention can also be utilized in a system having a plurality of hosts 15 and disk drives 20.

Figure 2:
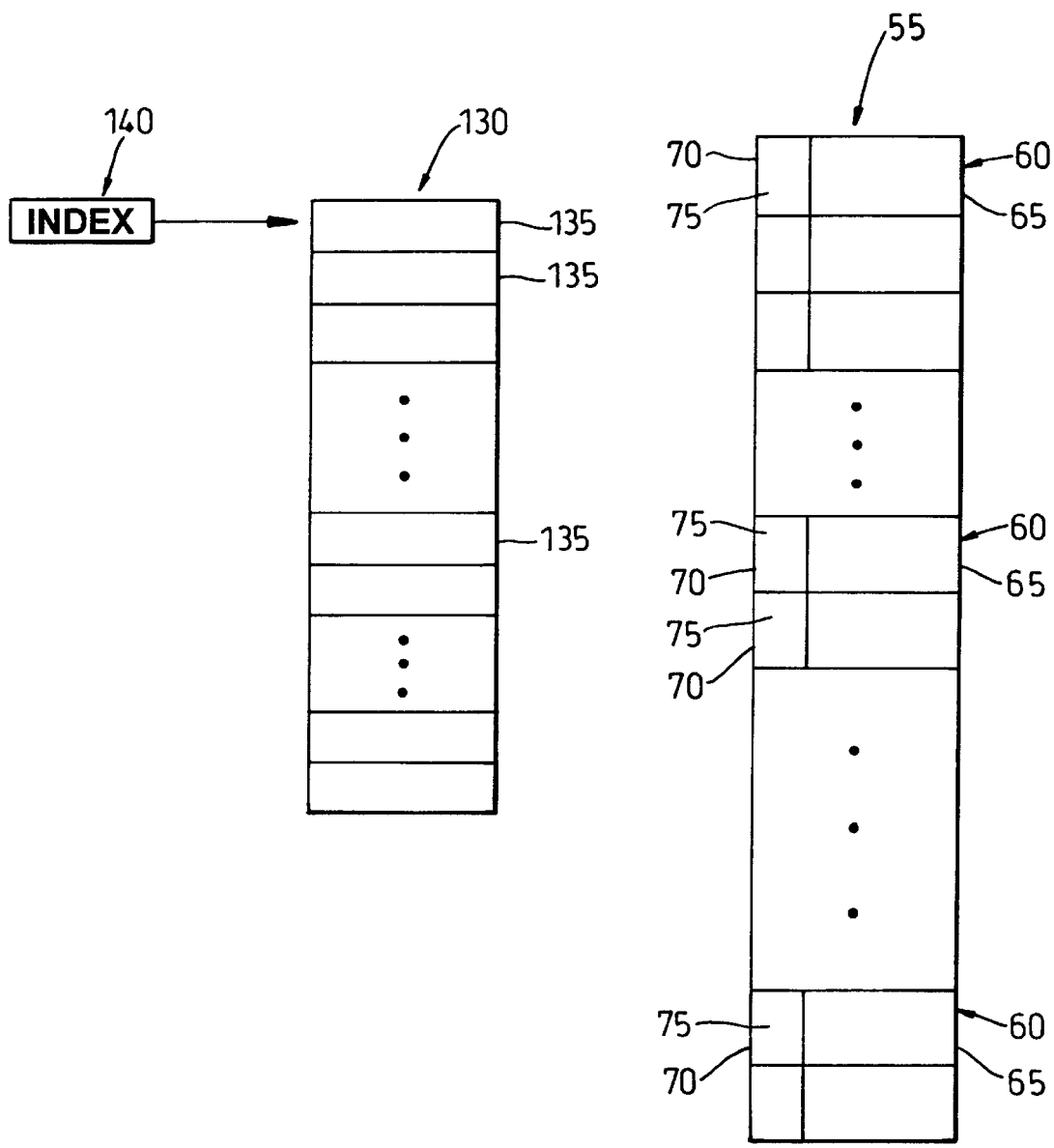
FIG. 2 shows a block diagram of an embodiment of a source data buffer organized in data blocks, and an embodiment of a buffer list for accessing the source data blocks.
Figure 3:
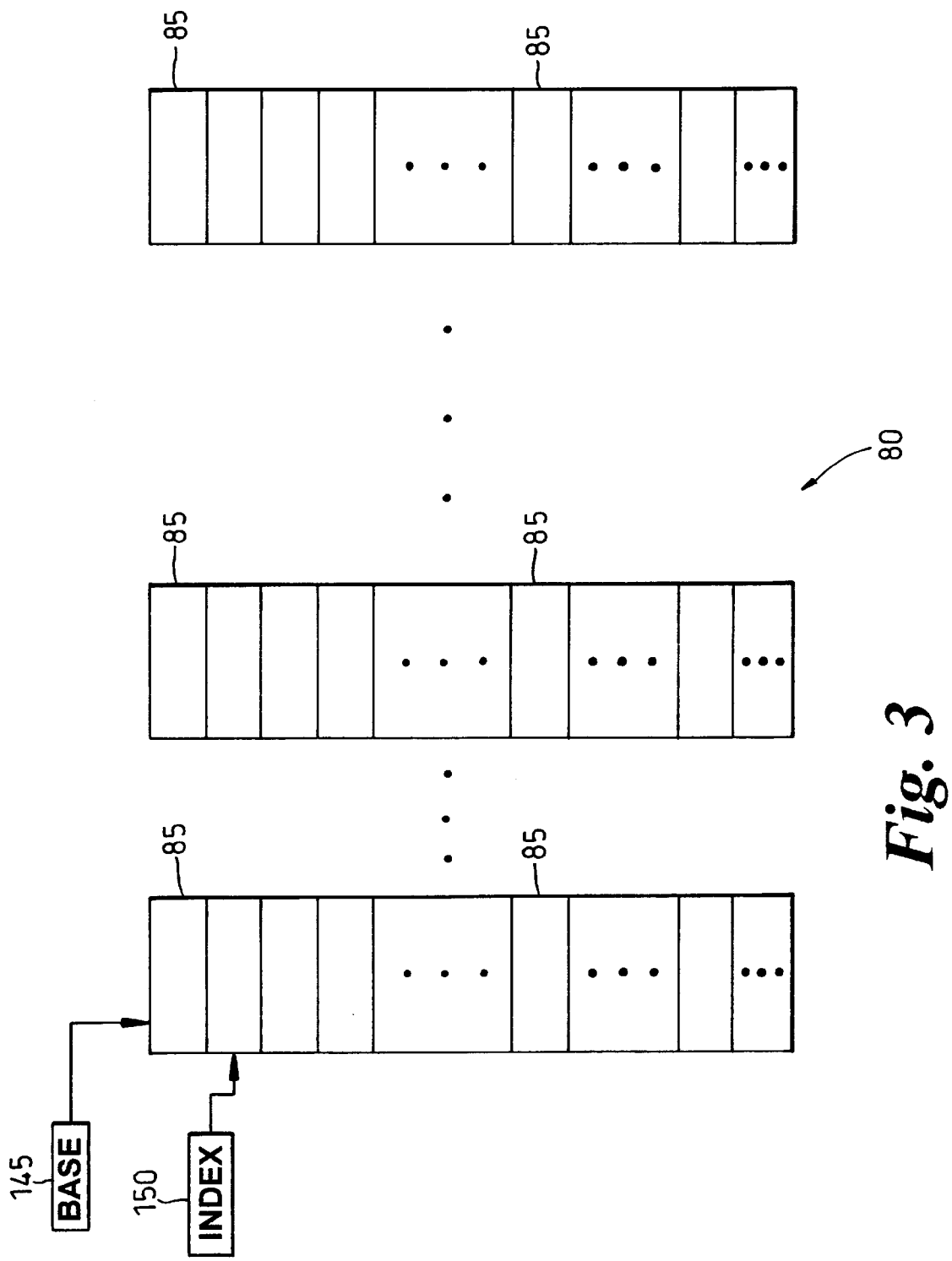
FIG. 3 shows a block diagram of an embodiment of a destination data buffer organized into data blocks.

An aspect of managing transfer of data through the data buffer system 25 includes preventing data transfers between the host 15 and the disk 52 from using corrupt or bad transfer addresses. Referring to FIG. 2, the data buffer system 25 comprises a source buffer 55 organized into a plurality of data blocks 60 each including a data field 65 and an identifier field 70. The data field 65 is for storage of data and the identifier field 70 is for an identifier 75 uniquely identifying the source block 60. Referring to FIG. 3, the destination buffer 80, residing on the disk 52, includes a plurality of data blocks 85 corresponding to the data blocks 60 of the source buffer 55, each destination block 85 having an address and being for storage of data.

Each source block identifier 75 is correlated to, or is a function of, the address of a corresponding destination block 85. This correlation is used to determine an expected identifier value 90 from the address of the destination block 85. Prior to transferring data from the source block 60 to the destination block 85, the expected value 90 is determined and the identifier 75 in the source block 60 is retrieved for comparison with the expected value 90. A mismatch indicates an error in one of the source or data block addresses, and results in an abort of the transfer or "write" to the destination block 85. Further steps may then be taken to deduce whether the source or the destination address was corrupt. The same steps apply for a "read" where data is transferred back from the destination buffer 80 to the source buffer 60. In that case, the buffers switch roles, where the destination buffer 80 is accessed as a data source and the source buffer 60 is accessed as a data destination.

Figure 4:
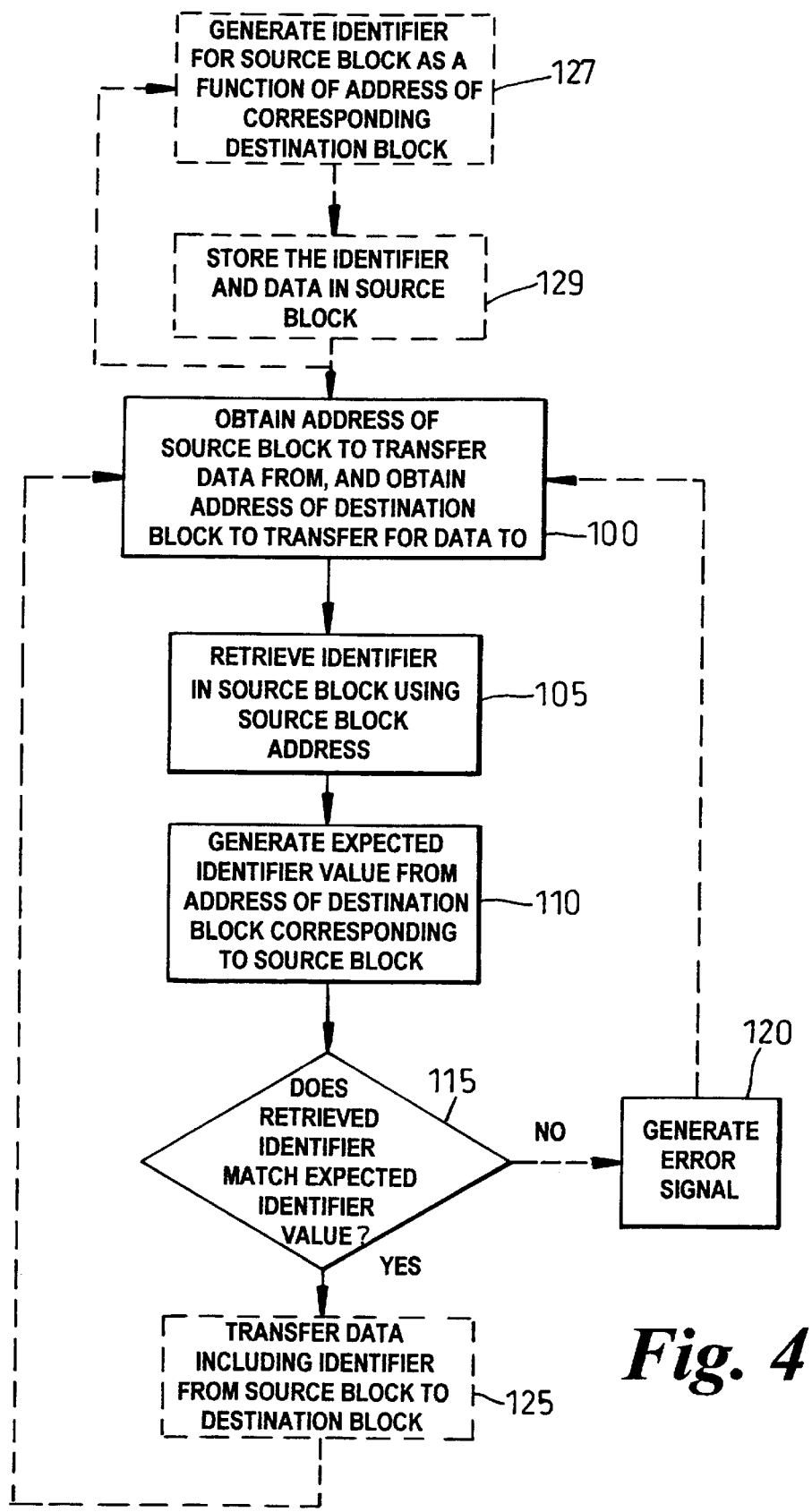
FIG. 4 shows an embodiment of the steps of a method of transferring data from the source buffer to the destination buffer according to the present invention.

Referring to FIG. 4, an embodiment of the method of the present invention comprises the steps of: (a) obtaining the address of a destination data block 85 to transfer data into, and obtaining the address of a corresponding source data block 60 to transfer data from (step 100); and (b) checking the integrity of said addresses before data transfer, including: (1) retrieving the identifier 75 from the source block 60 via the source block address (step 105); (2) generating an expected identifier value 90 for the source block 60 from the address of the destination block 85 via said function relation between the source block identifier 75 and the address of the destination block 85 (step 110); (3) comparing the expected identifier value 90 with the retrieved identifier 75 (step 115); and (4) if there is a mismatch, signaling an error condition representing corruption of one or more of the source block and the destination block addresses (step 120). Otherwise, the data and identifier 75 in each source block 60 can be transferred to the corresponding destination block 85 for correlations during future data transfers (step 125). As described further below, the method of the present invention can further include the steps of generating identifiers 75 for one or more source blocks 60 (step 127) and storing data including the identifiers 75 in the source blocks 60 (step 129), before the steps 100–125.

To transfer data from a plurality of source blocks 60 into a plurality of corresponding destination blocks 85, the above steps are repeated for a set of sequential destination blocks 85 and for a set of corresponding sequential source blocks 60. Referring to FIG. 2, a buffer list 130 is utilized to keep track of the data blocks 60. The buffer list 130 includes a plurality of entries 135 each including an address corresponding to a source block 60. The source blocks 60 may reside at various locations in the source buffer 55, but they can be accessed sequentially by indexing through the buffer list 130. Therefore, for each destination block 85, a corresponding source block 60 is accessed by indexing through the buffer list entries 135 using a buffer list index 140. The memory address of the buffer list 130 is stored in a buffer list base address register.

In the embodiment described herein, the correlation between the source block identifier 75 and the address of a destination block 85 is achieved by using a base value 145 for destination block addressing as shown in FIG. 3. An offset or index value 150 is then added to the base 145 for each destination block 85 in the destination buffer 80. The function relation between the identifier 75 and the address of the destination block 85 is that each of the identifier 75 and the expected identifier value 90 is the sum of the base 145 and index 150 of the address of the destination block 85. Therefore, the expected identifier value 90 is generated by summing the base 145 and index 150 of a destination block 85, and compared to the identifier 75 in a corresponding source block 60. In an ideal case with no corruption, the expected value 90 always matches the corresponding source block identifier 75. If an error occurs and any one address becomes corrupt, then the match fails, and data transfer is prevented or identified as bad.

In the embodiment described herein, to transfer data from the source buffer 55 to the destination buffer 80, the destination block index 150 is incremented sequentially to access consecutive destination blocks 85, and the buffer list index 140 is incremented in lockstep to access corresponding source blocks 60. The identifier 75 in each source block 60 is retrieved compared to an expected identifier value 90 calculated as described above to determine bad or corrupt transfer addresses. Although a base and index correlation scheme is described above, other correlation schemes are also contemplated by the present invention as described further below.

Figure 5:
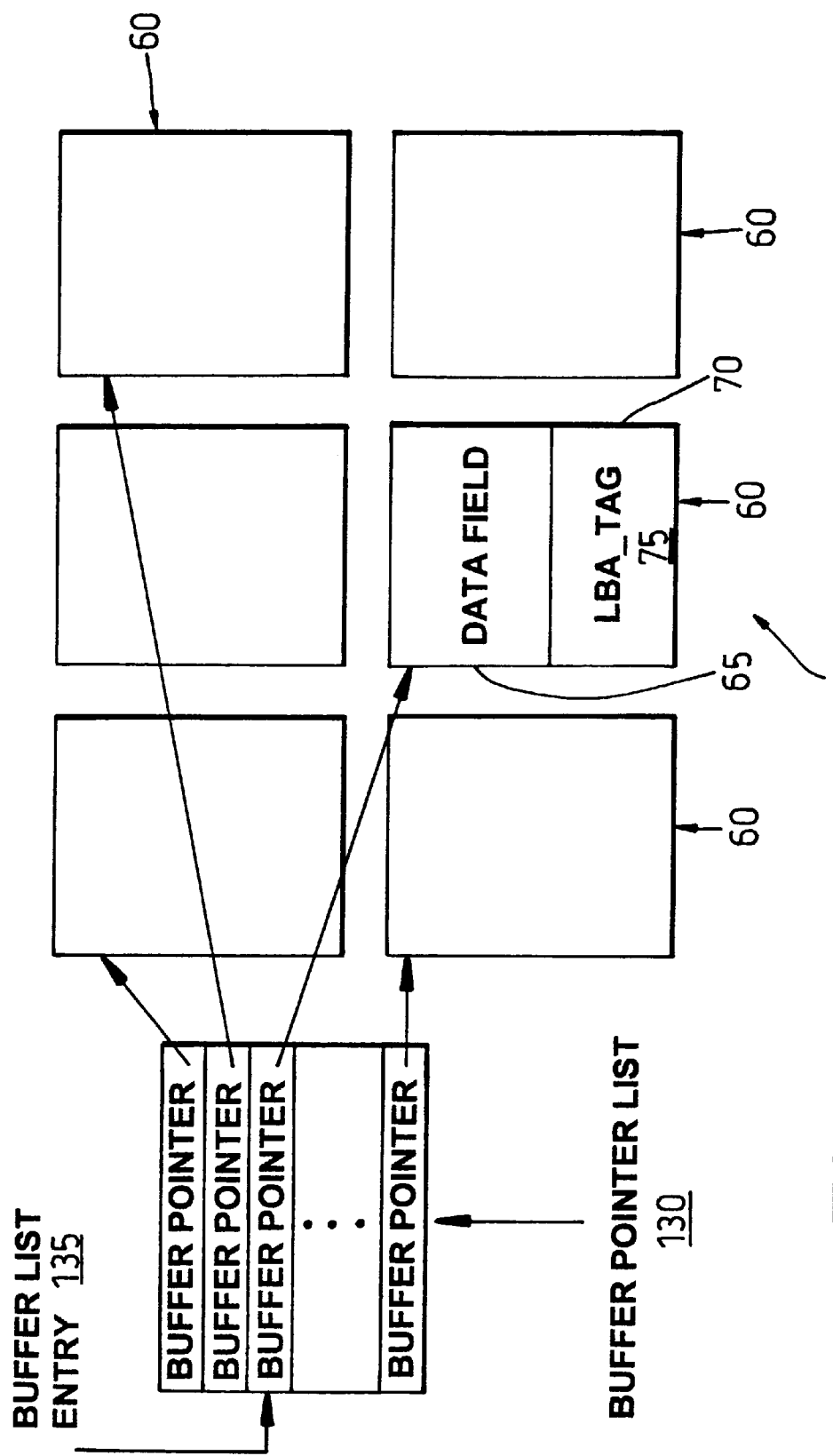
FIG. 5 shows a block diagram of an example buffer list and source buffer in memory, where the source data blocks include identifiers generated according to the present invention.
Figure 6:
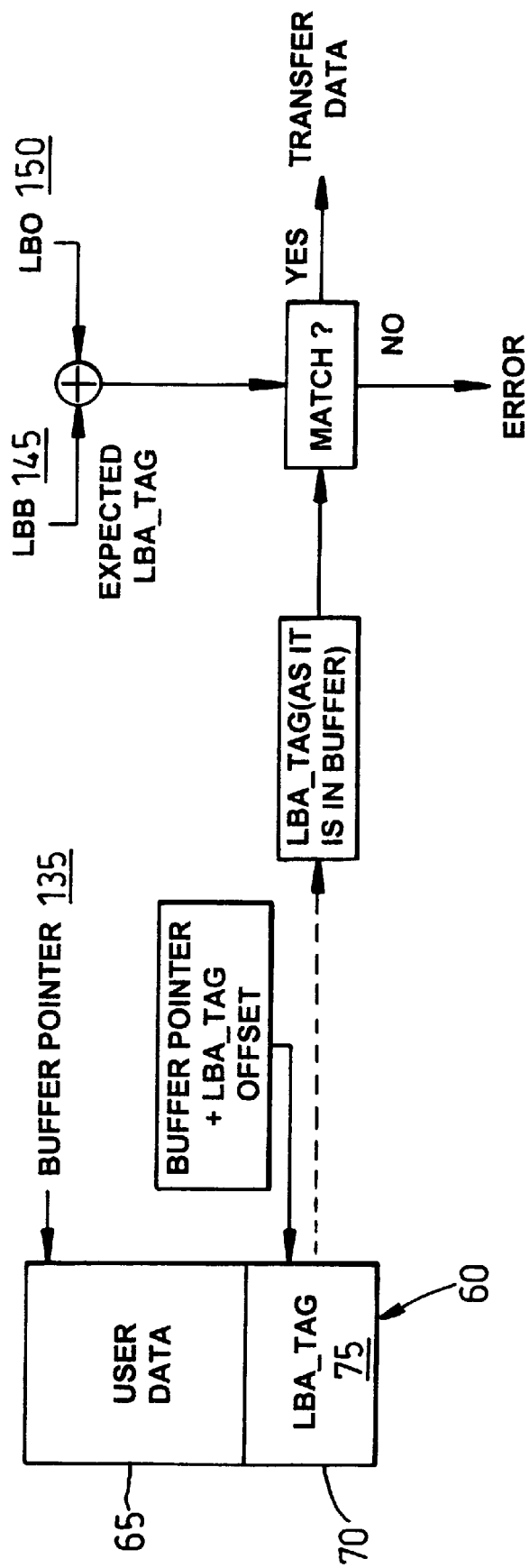
FIG. 6 shows an example method of data transfer from the source buffer of FIG. 5 according to the present invention.
Figure 7:
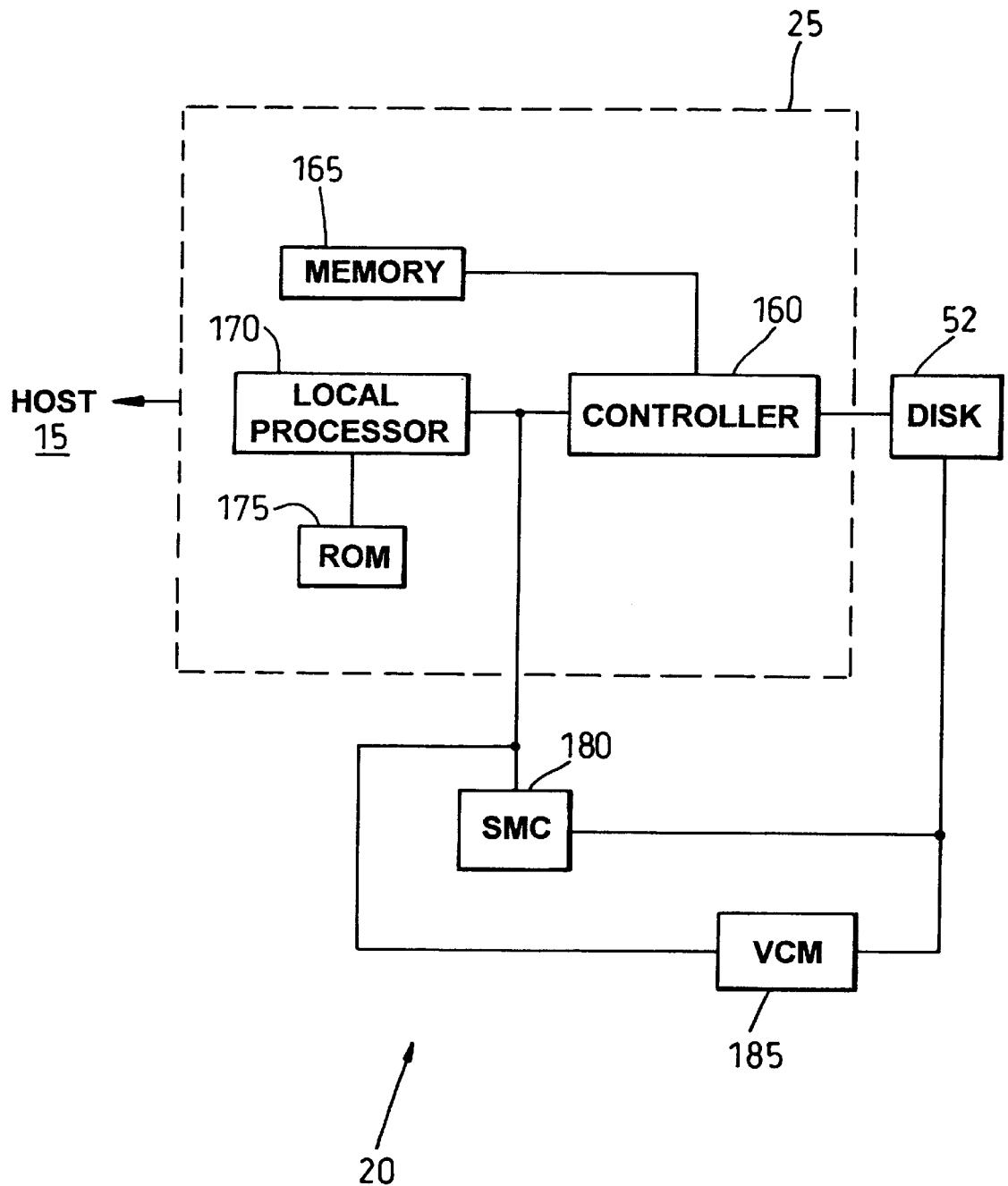
FIG. 7 shows a simplified block diagram of an example disk drive circuit including a controller logic circuit in which the present invention can be implemented.

Referring to FIGS. 5, 6 and 7, an example embodiment of the present invention, implemented as a method of transferring data between the host 15 and the disk 52, is now described. Initially, the identifiers 75 in the source data blocks 60 in a memory device (RAM) 165 in the data buffer system 25 are generated and stored therein by a translation process. The translation process utilizes a function correlation between each identifier 75 and the address of a corresponding destination block 85 to generate the identifiers 75. Thereafter, a data transfer process determines an expected identifier value 90 from the address of a destination block 85 based on said correlation, and retrieves the identifier 75 from the corresponding source block 60 for comparison and error detection as described above. An error in the source or destination addresses due to, for example, a small power-spike flipping a bit in an address, is discovered, preventing data transfer from the wrong location, or to the wrong location. As such, a data transfer process according to the present invention protects against any errors in the translation process or thereafter. The above steps are now described in detail.

Initially the host 15 creates fields of data as Host Blocks. The host 15 attaches a 32-bit Logical Block Address (LBA) to each Host Block to identify that block. Host Blocks, can be of a different size than destination blocks 85 on the disk 52. The Host Blocks have sequential 32-bit LBAs in a linear progression (e.g., 1,2,3,4,5,6 . . . ). The translator process receiving the data from the host 15 into the disk drive 20 translates each 32-bit LBA into a 15-bit LBA_Tag identifier 75. Referring to FIG. 5, the translator process then stores the LBA_Tags 75 in corresponding source blocks 60 in the RAM 165 along with other data. The LBA_Tag 75 in each source block 60 is later accessed by a data transfer process for comparison with an expected identifier value 90 calculated as described above. Though in this example, the LBA_Tag identifiers 75 are in a linear progression, other sequential identifiers can also be used, though not linear. Further, the LBA_Tags 75 can be any 32-bit number.

A Buffer Pointer List 130 is utilized to keep track of the data blocks 60 in the source buffer 55. The Buffer Pointer List 130 includes a list of Buffer Pointers 135 to source blocks 60, each Buffer Pointer 135 including the address of the beginning of a source block 60 in the RAM 165. For each destination block 85, there is a corresponding Buffer Pointer 135 in the Buffer Pointer List 130. For data transfer, the destination block index 150 is incremented sequentially to access consecutive destination blocks 85, and the buffer list index 140 is incremented in lockstep to access and retrieve the LBA_Tag identifiers 75 in corresponding source blocks 60. The base 145 and the index 140 of the address of each destination block 85 are added to generate an expected identifier value 90 for comparison with the retrieved LBA_Tags 75 of a corresponding source block 60. As such, the LBA_Tag identifier 75 for each source block 60 is used to check the identity of the source block 60 for data transfer. As such the data transfer process can ensure that a desired data block 60 is indeed the one being accessed.

The aforementioned correlation between the LBA_Tag identifier 75 in each source block 60 and the address of a corresponding destination block 85 is based on mapping of the source buffer 55 in the RAM 165 and the destination buffer 80 on the disk 52 into blocks of the same size. The disk 52 is organized as concentric tracks each containing a plurality of destination blocks 85. For example, track 0 can include 500 destination blocks 85 numbered from 0 through 499. The address for each destination block 85 is the combination of the base 145 or Logical Block Base (LBB), identifying a track, and the index 150 or Logical Block Offset (LBO), identifying a block number within that track. Each track is assigned an LBB, and as the destination blocks 85 are indexed incrementally on the track, the LBO is incremented accordingly. Therefore, for block 0 of track 0, the LBO=0 and the LBB=0. For block 1 of track 0, the LBO=1 and the LBB=0. The LBB ranges through all the tracks and the LBO ranges through all the blocks within each track.

Referring to FIG. 6, the correlation between the LBA_Tag 75 of a source block 60 in the RAM 165, and the LBB 145 and LBO 150 of the corresponding destination block 85 on the disk 52 is represented by the function correlation LBA_Tag=LBO+LBB. Other correlations between the LBA_Tags 75 and the destination block addresses are also possible and contemplated by the present invention. In general, instead of a base+index function, any other repeatable function can be utilized. In that case, the translation process can generate identifiers 75 for the source blocks 60 using said function, and thereafter, the data transfer process can use the exact function to determine an expected identifier value 90 to compare to the identifier 75 in the source block accessed as discussed above.

The translator process translates the Host Block 32-bit LBAs forming a linear progression (e.g., 1,2,3,4, . . . ), into 15-bit LBA_Tags 75 that are also in a linear progression. Since the physical disk destination blocks 85 are also addressed in a linear progression, a translation of a base+index provides simplicity and speed. However, other methods of translating the 32-Bit Host Block LBAs to LBA_Tags 75 can also be used. The translation depends on the size of the Host Blocks and the size of the disk drive data blocks 85. If they are the same size, the preferred translation for simplicity and speed is using the lower 15-bits of the host's 32-bit LBA as the 15-bit LBA_Tags 75. Therefore, other translations of the 32-bit LBAs, or the full 32-bit LBA, can also be used as LBA_Tags 75. Further, the data can be re-partitioned into different size blocks as necessary, so long as the 15-bit LBA_Tag identifier 75 of sequential blocks is formatted such that the transfer process can calculate expected identifier values 90 from addresses of sequential destination blocks 85 on the disk 52.

In an example operation scenario, a user directs a host computer 15 running an application program to save a file the user has been working on to disk. The host computer 15 interprets the save command into: (1) A write of the file to disk 52, and (2) The file to be written is at Host LBA locations at memory addresses ranging from 0x00001000 to 0x0002000. The LBA location is determined by the operating system and the file allocation table of the disk drive 20, and represents a 512 KByte block of data. The host 15 then sends a command to the disk drive 20, along with the data (Host Block), to write to locations 0x00001000 to 0x00002000. The disk drive 20 receives the write command requiring it to accept data from the host 15 and place the data into the disk drive's RAM 165. The translation process translates the Host LBA address 0x00001000 (32-bits) into an LBA_Tag 75 of 0x1000(16-bits). The LBA_Tag 75 is appended to each data block 60 and stored with the data block in the disk drive's RAM 165.

Thereafter, a circuit for accessing the physical disk 52 seeks to the appropriate location on disk 52 where Host Blocks with LBAs beginning with 0x00001000 are to be stored. The circuit is provided with an LBB of 0x1000. When the disk head is ready to write the data to the disk 52, a transfer process first determines that it is accessing the physical destination block 85 with LBO=0x0000 on the track with LBB=0x1000. The process then accesses the Buffer Pointer List 130 for a Buffer Pointer 135 to the location of the source data block 60 in the RAM 165 to transfer or write to destination block 85 with LBB=0x1000 and LBO=0x0000. The process then calculates the LBB+LBO=0x1000 for said destination block 85 as the expected identifier value 90. The process then accesses the source data block 60 in the RAM 165 using the Buffer Pointer 135 to retrieve the LBA_Tag 75 associated with that source block, and compares the LBA_Tag 75 of 0x1000 therein with the calculated expected identifier value 90 of 0x1000. Since the two values match, the data can be safely written to the disk 52 at the destination block 85 with LBB=0x1000 and LBO=0x0000.

Proceeding to the next block, LBO is incremented once, and the disk head is ready to write data to the physical destination block 85 at the current track with LBB=0×1000 and LBO=0×0001. The transfer process indexes into the Buffer Pointer List 130 to look for the address of the next source data block 60 in the RAM 165 to transfer to destination block 85 with LBB=0×1000 and LBO=0×0001. However, unknown to any processes, a stream of radiation has altered a bit in an entry of the Buffer List Pointer 130, and the Buffer Pointer 135 therein is corrupt as a result. The corrupt Buffer Pointer 135 is pointing to a location in the RAM 165 other than said source data block 60. The transfer process calculates LBB+LBO=0×1001 as the expected identifier value 90 for physical destination block 85 with LBB=0×1000 and LBO=0×0001.

Thereafter, the transfer process accesses a location in the RAM 165 using the faulty Buffer Pointer 135, and retrieves a value for an LBA_Tag 75. However, due to the corrupt Buffer Pointer 135, the transfer process attempting to retrieve the intended LBA_Tag 75 of 0×1001, has instead retrieved irrelevant data or another LBA_Tag 75. Comparing the expected value 90 with the retrieved LBA_Tag 75 fails and the write to the disk 52 is prevented. The disk drive 20 can alert the host computer 15 and/or take corrective action for the destination block 85 with LBB+LBO=0×1001. Without the detection method of the present invention: (1) the wrong data would have been written to the right place, and the user would have found erroneous data in her file when she later opened it, and (2) the intended data block would not have be written to disk, and therefore lost. The transfer process continues for the remaining source and destination blocks.

Although in the above examples the source buffer 55 resided in the RAM 165 and the destination buffer 80 resided on the disk 52, the method of the present invention is applicable to other cases as well. For example, both the destination and source buffers can reside in memory, or the destination buffer can reside in memory and the source buffer reside on disk.

The method of the present invention prevents the erroneous writing of unknown data to a known destination (corrupt source address), and also prevents the erroneous writing of known data to an unknown destination (corrupt destination address). It also prevents data from being overwritten in the latter case, preventing complete loss without recovery. The method is efficient and simple to implement without introducing any faults into an implementing system. Further, one identifier can be used to tag larger fields of data. The method can also enhance other schemes of protection by preventing the aforementioned errors. And, transferring the identifier tag with the data prevents similar errors when the source and destination switch roles for a "read" operation as described above. In case of a read (i.e.—reading data from the source buffer 55 on the disk 52 into the destination buffer 80 in the data buffer system 25) the method of the present invention prevents the transfer of different data than intended to the host 15. Without such a method, an error in the address of either the source buffer 55 on the disk 52 or the destination buffer 80 in the buffer system 25, can cause improper transfer and loss of data as described above.

The present invention can be implemented as program instructions to be performed by a processor or to configure a logic circuit. The program instructions can be implemented in a high level programming language such as C, Pascal, etc. which is then compiled into object code and linked with object libraries as necessary to generate executable code for the processor. The program instructions can also be implemented in assembly language which is then assembled into object code and linked with object libraries as necessary to generate executable code.

Referring to FIG. 7, preferably, a controller logic circuit 160 is configured by the program instructions to perform the steps described above. The logic circuit 160 can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods. A dedicated logic circuit, such as an ASIC, provides higher performance than a microprocessor since the logic is implemented directly in the chip rather than using an instruction set requiring multiple clock cycles to be executed by a microprocessor.

The controller logic circuit 160 can be interconnected to the memory device 165, a microprocessor 170 and a ROM 175. Typically, the ROM 175 includes data and program instructions for the microprocessor 170 to interact with a spindle motor controller (SMC) 180 and a voice coil motor controller (VCM) 185 in the disk drive 20, and to oversee transfer of data between a host 15 and the disk drive 20 through the memory device 165. The memory device 165 includes the source buffer 55 for storing data into and retrieving data from the disk 52. The memory device 165 can also be used to store and maintain the buffer list 130.

Other means, comprising memory devices, processors, logic circuits, and/or analog circuits, for performing the above steps are possible and contemplated by the present invention. Therefore, a controller according to the present invention should not be limited to the descriptions of the versions described herein. Further, other examples of applications of the present invention are for Tape Storage devices and "Solid State" storage devices. Such devices are similar to disk drives, but include memory chips replacing the physical disks mounted on a spindle. The present invention can also be used in block transfers of data between two host machines.

Although the present invention has been described in considerable detail with regard to the preferred versions thereof, other versions are possible. Therefore, the appended claims should not be limited to the descriptions of the preferred versions contained herein.

What is claimed is:

1. In a data processing system having at least one source buffer and at least one destination buffer, the source buffer including a plurality of data blocks, each data block having an address and being for storage of data including an identifier uniquely identifying that data block, the destination buffer including a plurality of data blocks corresponding to the data blocks of the source buffer, each destination block having an address and being for storage of data, each source block identifier being a function of a corresponding destination block address, a method of data transfer from the source buffer to the destination buffer, comprising the steps of:

(a) obtaining the address of a data block in the destination buffer to transfer data into;

(b) obtaining the address of a corresponding data block in the source buffer to transfer data from; and (c) checking the integrity of said addresses before data transfer, including the steps of:
   (i) retrieving the source block identifier in the source block via the source block address;
   (ii) generating an expected identifier value for the source block from the address of the destination block via said function relation between the source block identifier and the destination block address;
   (iii) comparing the expected identifier value with the retrieved identifier value; and
   (iv) if there is a mismatch, signaling an error condition representing corruption of one or more of the source block and the destination block addresses.

2. The method of claim 1, further comprising transferring data from a plurality of source blocks into a plurality of corresponding destination blocks in sequence, including repeating steps (a) through (c) for a plurality of destination blocks and corresponding source blocks.

3. The method of claim 1, further comprising the steps of maintaining a source buffer list including a plurality of entries each including an address corresponding to a source block, wherein step (b) includes accessing a buffer list entry to obtain the source block address.

4. The method of claim 3, wherein accessing the buffer list entry includes using a buffer list index into the buffer list, the index being proportional to the address of the corresponding destination block.

5. The method of claim 4, wherein the address for each destination block is a combination of a base and an offset, the offset being proportional to said buffer list index.

6. The method of claim 5, wherein the identifier in each source block is the sum of the base and offset for a corresponding destination block.

7. The method of claim 1, wherein the address for each destination block is a combination of a base and an offset, the identifier in each source block being the sum of the base and offset for the address of a corresponding destination block.

8. The method of claim 7, wherein the step of generating the expected identifier value comprises summing the base and offset for the address of the corresponding destination block.

9. The method of claim 1, further comprising the step of: if there is a match between the retrieved identifier and the expected identifier value, transferring the data including the identifier stored in the source block to the destination block.

10. The method of claim 1, wherein the data processing system comprises a computer system including at least one host connected to at least one storage device through a data buffer system, the data buffer system including the source buffer, and the storage device including the destination buffer.

11. The method of claim 1, wherein the data processing system comprises a computer system including at least one host connected to at least one storage device through a data buffer system, the data buffer system including the destination buffer, and the storage device including the source buffer.

12. In a data processing system having at least one source buffer and at least one destination buffer, the source buffer including a plurality of data blocks, each data block having an address and being for storage of data including an identifier uniquely identifying that data block, the destination buffer including a plurality of data blocks corresponding to the data blocks of the source buffer, each destination block having an address and being for storage of data, a method of data transfer from the source buffer to the destination buffer, comprising the steps of:

(a) for at least one source data block in the source buffer:
   (i) generating an identifier uniquely identifying that source data block, the identifier being a function of the address of a destination data block corresponding to that source data block, and (ii) storing data including said identifier in the source data block;

(b) obtaining the address of a destination data block to transfer data into;

(c) obtaining the address of a source data block to transfer data from; and (d) checking the integrity of said addresses before data transfer, including the steps of:
   (i) retrieving the identifier in the source data block via the source data block address;
   (ii) generating an expected identifier value for the source data block from the address of the destination data block via said function relation between the identifier and the destination data block address;
   (iii) comparing the expected identifier value with the retrieved identifier value; and
   (iv) if there is a mismatch, signaling an error condition representing corruption of one or more of the source block and the destination block addresses.

13. The method of claim 12, further comprising transferring data from a plurality of source blocks into a plurality of corresponding destination blocks in sequence, including repeating steps (a) through (d) for a plurality of source data blocks and corresponding destination data blocks.

14. The method of claim 12, further comprising the steps of maintaining a source buffer list including a plurality of entries each including an address corresponding to a source block, wherein step (c) includes accessing a buffer list entry to obtain the source block address.

15. The method of claim 14, wherein accessing the buffer list entry includes using a buffer list index into the buffer list, the index being proportional to the address of the corresponding destination block.

16. The method of claim 15, wherein the address for each destination block is a combination of a base and an offset, the offset being proportional to said buffer list index.

17. The method of claim 16, wherein the identifier in each source block is the sum of the base and offset for a corresponding destination block.

18. The method of claim 12, wherein the address for each destination block is a combination of a base and an offset, the identifier in each source block being the sum of the base and offset for the address of a corresponding destination block.

19. The method of claim 18, wherein the step of generating the expected identifier value comprises summing the base and offset for the address of the corresponding destination block.

20. The method of claim 12, further comprising the step of: if there is a match between the retrieved identifier and the expected identifier value, transferring the data including the identifier stored in the source block to the destination block.

21. The method of claim 12, wherein the data processing system comprises a computer system including at least one host connected to at least one storage device through a data buffer system, the data buffer system including the source buffer, and the storage device including the destination buffer.

22. The method of claim 12, wherein the data processing system comprises a computer system including at least one host connected to at least one storage device through a data buffer system, the data buffer system including the destination buffer, and the storage device including the source buffer.

23. A controller for managing transfer of data from a source buffer to a destination buffer, the source buffer including a plurality of data blocks, each data block having an address and being for storage of data including an identifier uniquely identifying that data block, the destination buffer including a plurality of data blocks corresponding to the data blocks of the source buffer, each destination block having an address and being for storage of data, each source block identifier being a function of a corresponding destination block address, the controller comprising a logic circuit configured by program instructions to perform the steps of:

(a) obtaining the address of a data block in the destination buffer to transfer data into;

(b) obtaining the address of a corresponding data block in the source buffer to transfer data from; and (c) checking the integrity of said addresses before data transfer, including the steps of:
  (i) retrieving the source block identifier in the source block via the source block address;
  (ii) generating an expected identifier value for the source block from the address of the destination block via said function relation between the source block identifier and the destination block address;
  (iii) comparing the expected identifier value with the retrieved identifier value; and
  (iv) if there is a mismatch, signaling an error condition representing corruption of one or more of the source block and the destination block addresses.

24. The controller of claim 23, wherein the logic circuit program instructions further include program instructions for transferring data from a plurality of source blocks into a plurality of corresponding destination blocks in sequence, including repeating steps (a) through (c) for a plurality of destination blocks and corresponding source blocks.

25. The controller of claim 23, wherein the controller further comprises a source buffer list including a plurality of entries each including an address corresponding to a source block, and wherein the logic circuit program instructions for performing step (b) further include program instructions for accessing a buffer list entry to obtain the source block address.

26. The controller of claim 25, wherein the logic circuit program instructions for accessing the buffer list entry further include program instructions for using a buffer list index into the buffer list, the index being proportional to the address of the corresponding destination block.

27. The controller of claim 26, wherein the address for each destination block is a combination of a base and an offset, the offset being proportional to said buffer list index.

28. The controller of claim 27, wherein the identifier in each source block is the sum of the base and offset for a corresponding destination block.

29. The controller of claim 23, wherein the address for each destination block is a combination of a base and an offset, the identifier in each source block being the sum of the base and offset for the address of a corresponding destination block.

30. The controller of claim 29, wherein the logic circuit program instructions for generating the expected identifier comprise program instructions for summing the base and offset for the address of the corresponding destination block.

31. The controller of claim 23, wherein the logic circuit program instructions further include program instructions for performing the step of: if there is a match between the retrieved identifier and the expected identifier value, transferring the data including the identifier stored in the source block to the destination block.

32. The controller of claim 23, wherein the destination buffer resides in a storage device.

33. The controller of claim 32 wherein the storage device comprises a disk drive disk, and wherein the destination buffer resides on the disk drive disk.

34. The controller of claim 23 wherein the source buffer resides in a storage device.

35. The controller of claim 34 wherein the storage device comprises a disk drive disk, and wherein the source buffer resides on the disk drive disk.

* * * * *